United States Patent
Huang

(10) Patent No.: US 8,302,971 B2
(45) Date of Patent: Nov. 6, 2012

(54) SEALING DEVICE FOR A PUMP

(75) Inventor: Shou-Hsiung Huang, San Chi (TW)

(73) Assignee: Walrus Pump Co., Ltd, Taipei Hsien (TW)

( * ) Notice: Subject to any disclaimer, the term of this patent is extended or adjusted under 35 U.S.C. 154(b) by 301 days.

(21) Appl. No.: 12/793,639

(22) Filed: Jun. 3, 2010

(65) Prior Publication Data

US 2011/0298182 A1 Dec. 8, 2011

(51) Int. Cl.
*F16J 15/34* (2006.01)
(52) U.S. Cl. ........ 277/370; 277/372; 277/373; 277/390; 277/397
(58) Field of Classification Search .......... 277/370–373, 277/390, 397
See application file for complete search history.

(56) References Cited

U.S. PATENT DOCUMENTS

| | | | | |
|---|---|---|---|---|
| 3,612,548 A * | 10/1971 | Tracy | ............................ | 277/385 |
| 3,672,689 A * | 6/1972 | Hadley | .......................... | 277/373 |
| 3,889,960 A * | 6/1975 | Wiese | ............................ | 277/397 |
| 3,931,978 A * | 1/1976 | Grimston | ....................... | 277/385 |
| 4,659,092 A * | 4/1987 | Wallace et al. | ............... | 277/360 |
| 5,544,897 A * | 8/1996 | Di Pietro et al. | .............. | 277/389 |
| 6,003,875 A * | 12/1999 | Ellis et al. | ...................... | 277/370 |
| 6,357,753 B1 * | 3/2002 | Yamasaki et al. | ............. | 277/372 |
| 6,460,858 B1 * | 10/2002 | Kitajima et al. | .............. | 277/370 |
| 7,204,490 B2 * | 4/2007 | Huang | ........................... | 277/372 |
| 8,033,549 B2 * | 10/2011 | Huang | .......................... | 277/366 |

* cited by examiner

*Primary Examiner* — Vishal Patel
(74) *Attorney, Agent, or Firm* — Hershkovitz & Associates, LLC; Abraham Hershkovitz

(57) ABSTRACT

A sealing device for a pump has a sleeve, a rotary collar, a first O-ring, a stationary collar, a mounting bracket, a second O-ring, a mounting collar and a locking pin. The rotary collar, stationary collar, mounting bracket and mounting collar are mounted around the sleeve. The first O-ring is mounted between the sleeve and the rotary collar. The second O-ring is mounted between the mounting bracket and the stationary collar. The locking pin is mounted securely between the mounting bracket and the stationary collar. The O-rings provide multi-sealing functions. The locking pin prevents relative rotation between the mounting bracket and stationary collar.

4 Claims, 5 Drawing Sheets

SEALING DEVICE FOR A PUMP

BACKGROUND OF THE INVENTION

1. Field of the Invention

The present invention relates to a sealing device, and more particularly to a sealing device for a pump that is mounted on a shaft of a motor of a pump and effectively seals a water chamber of the pump to prevent leakage of the water chamber damaging the motor.

2. Description of Related Art

Pumps are generally mechanical devices and are used for pumping fluid such as water or air for transportation of such fluid from lower places to higher places.

A conventional pump comprises a housing, a motor and a seal.

The casing has a coupling chamber, a water chamber, an inlet hole and an outlet hole. The coupling chamber and the water chamber are defined in the casing and have a partition formed therebetween. The partition has a shaft hole defined therethrough and communicating with the coupling chamber and water chamber. The inlet and outlet holes are defined in the casing and communicate with the water chamber. The motor is mounted on the pump and has a coupling, a shaft and multiple turbine blades. The coupling is mounted rotatably on the motor and is located in the coupling chamber. The shaft is connected to the coupling, extends through the shaft hole and in the water chamber. The turbine blades are mounted on the shaft and are located in the water chamber. The seal is mounted in the shaft hole, supports the shaft and seals the water chamber to prevent water in the water chamber from leaking.

However, the seal serves as a bearing and has multiple components assembled together so that the seal cannot effectively seals the water chamber and leakage easily occurs between adjacent components.

To overcome the shortcomings, the present invention provides a sealing device for a pump to mitigate or obviate the aforementioned problems.

SUMMARY OF THE INVENTION

The main objective of the invention is to provide a sealing device for a pump that is mounted on a shaft of a motor of a pump and effectively seals a water chamber of the pump to prevent leakage of the water chamber damaging the motor.

A sealing device for a pump in accordance with the present invention has a sleeve, a rotary collar, a first O-ring, a stationary collar, a mounting bracket, a second O-ring, a mounting collar and a locking pin. The rotary collar, stationary collar, mounting bracket and mounting collar are mounted around the sleeve. The first O-ring is mounted between the sleeve and the rotary collar. The second O-ring is mounted between the mounting bracket and the stationary collar. The locking pin is mounted securely between the mounting bracket and the stationary collar. The O-rings provide multi-sealing functions. The locking pin prevents relative rotation between the mounting bracket and stationary collar.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
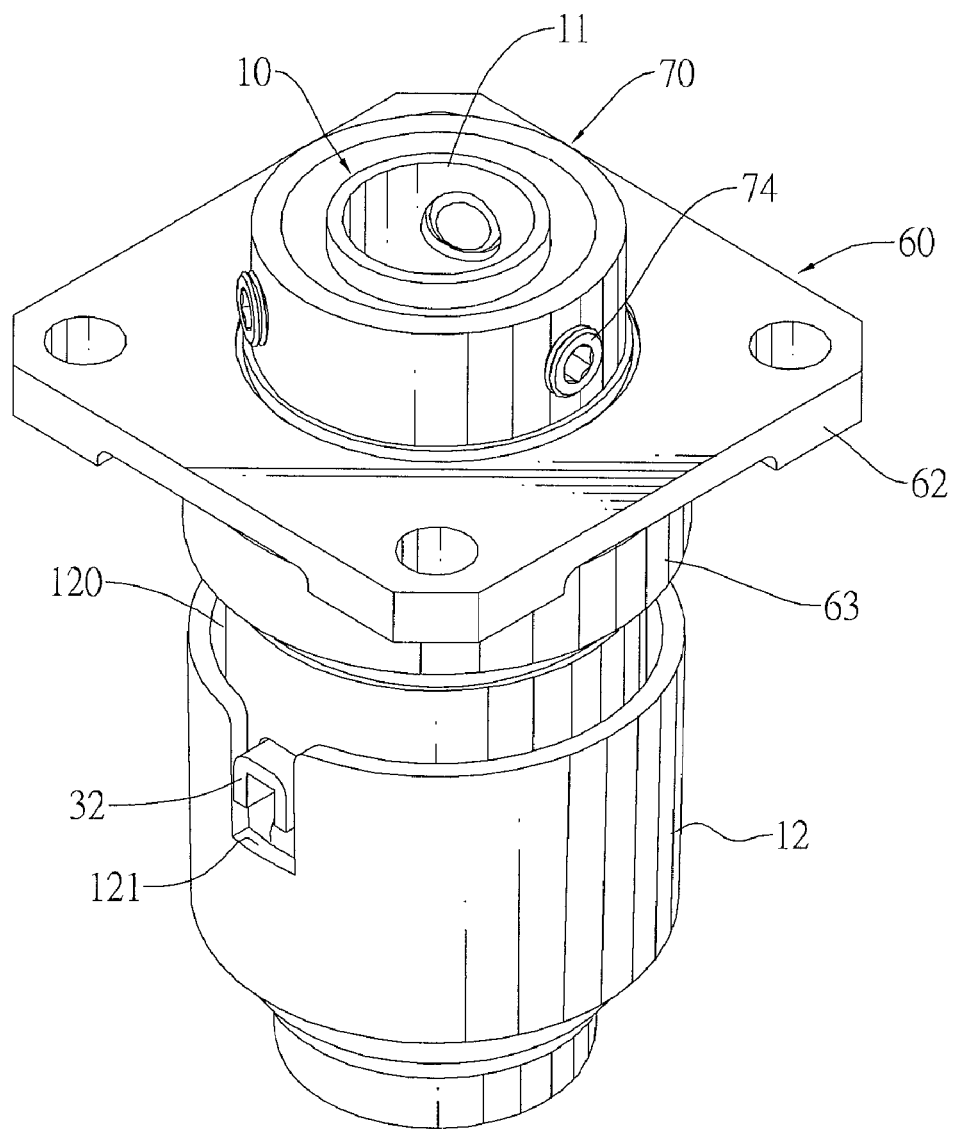
FIG. 1 is a perspective view of a sealing device for a pump in accordance with the present invention.
Figure 2:
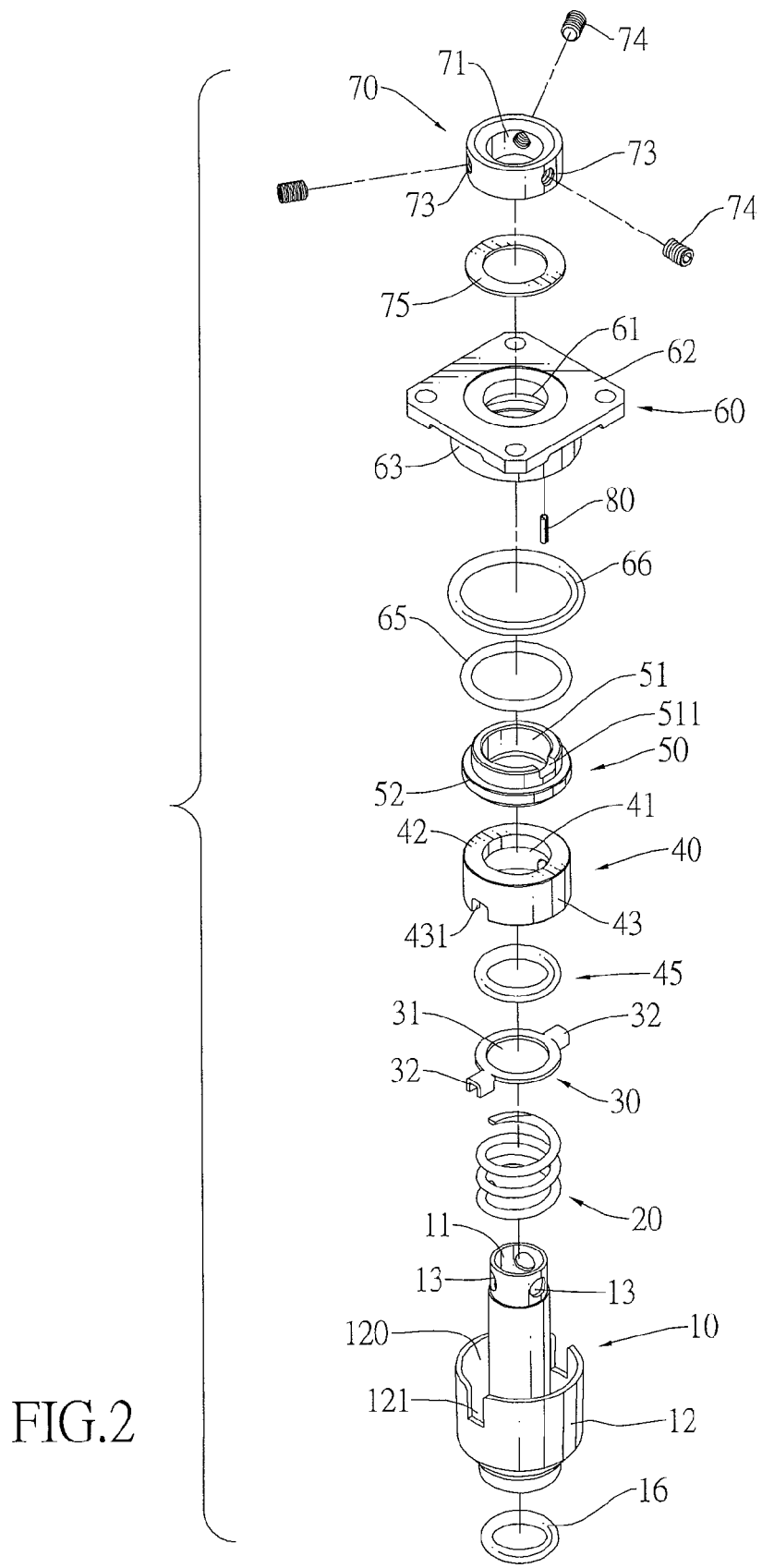
FIG. 2 is an exploded top perspective view of the sealing device in FIG. 1.
Figure 3:
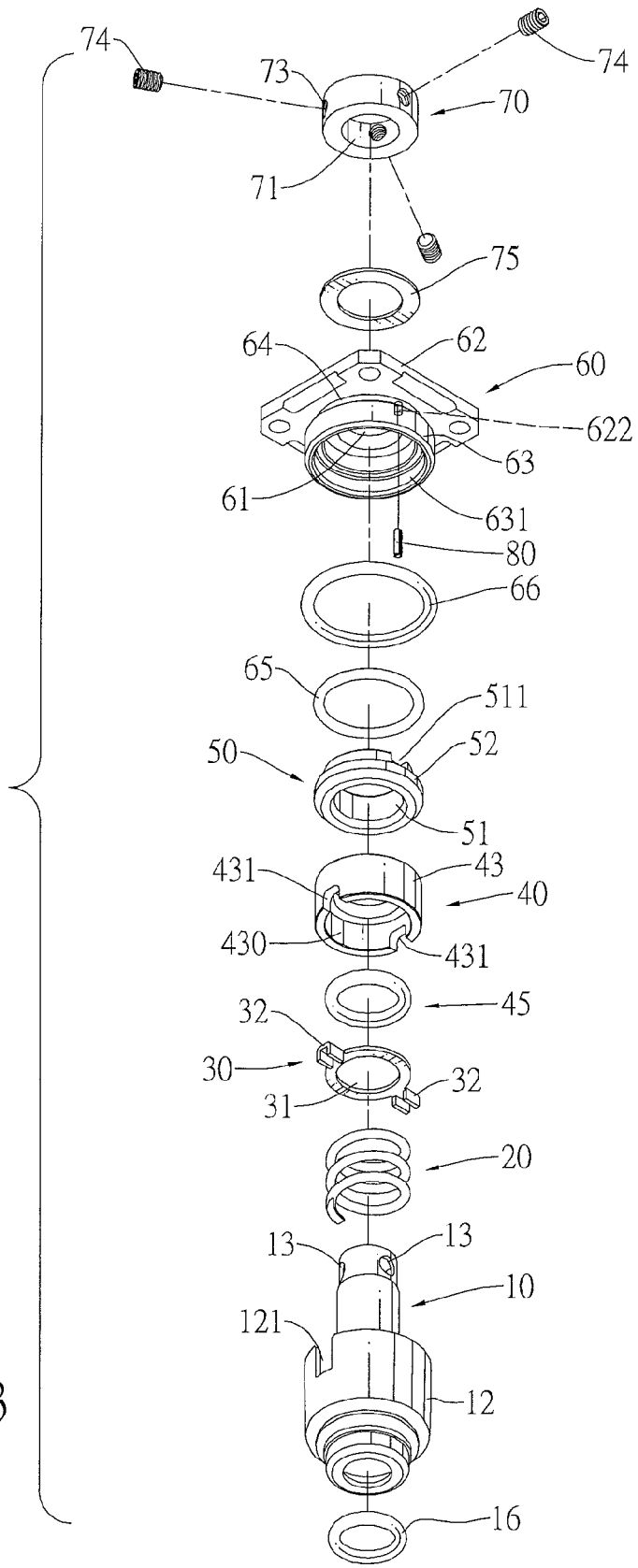
FIG. 3 is an exploded bottom perspective view of the sealing device in FIG. 1.

With reference to FIGS. 1 to 3 and 5, a sealing device in accordance with the present invention is mounted in a pump. The pump has a housing 90, a shaft 95 and a coupling 96. The housing 90 has a water chamber 91, a coupling chamber 92, a partition and a shaft aperture 93. The water chamber 91 and the coupling chamber 92 are defined in the pump 90. The partition is formed between the water chamber 91 and the coupling chamber 92. The shaft hole is defined through the partition and communicates with the water chamber 91 and the coupling chamber 92. The shaft 95 is mounted rotatably through the shaft aperture 93 and extends in the water chamber 91 and has a connecting end. The coupling 96 is mounted on the connecting end of the shaft 95 and is connected to a motor.

Figure 4:
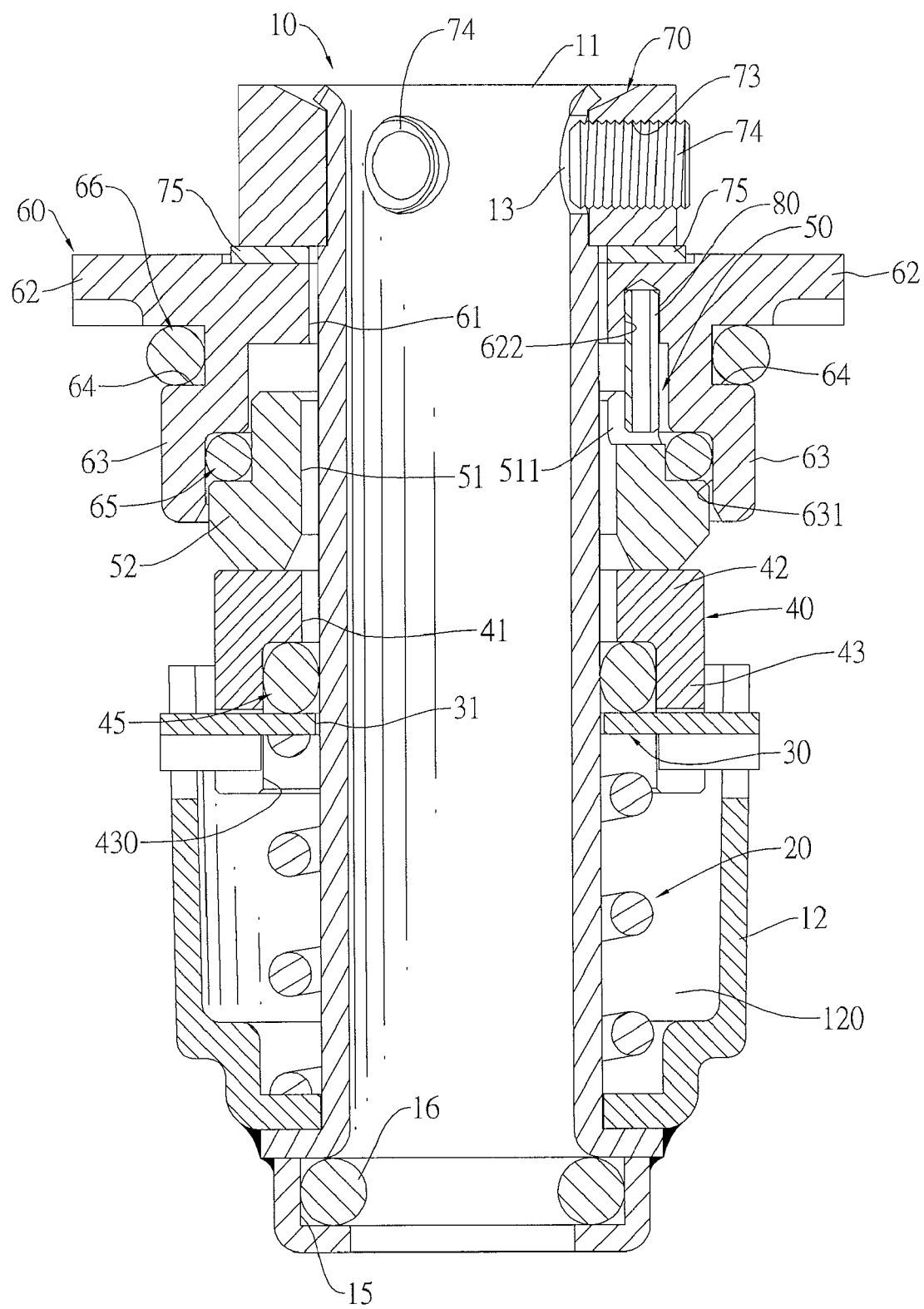
FIG. 4 is a cross sectional side view of the sealing device in FIG. 1.
Figure 5:
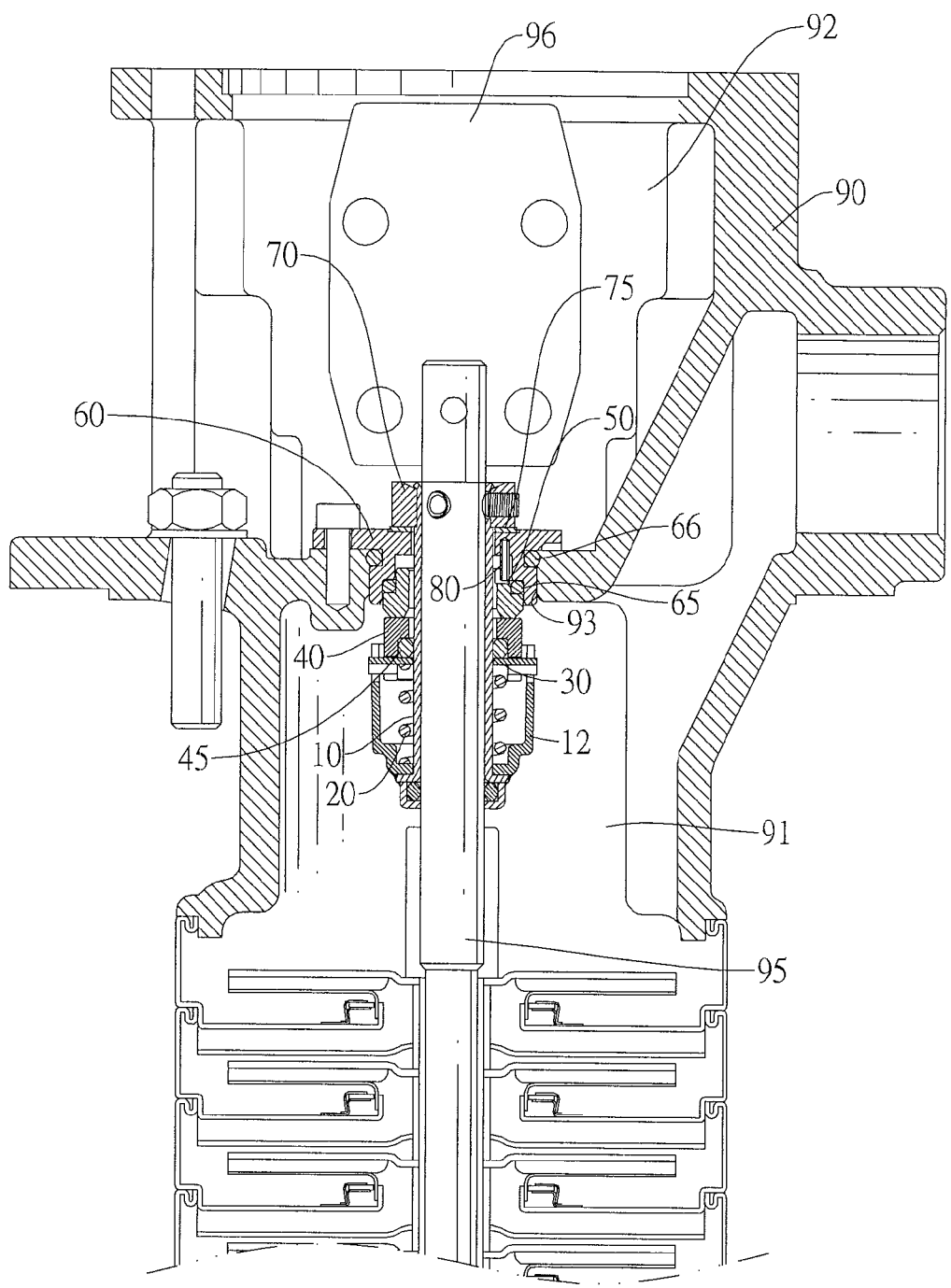
FIG. 5 is a side view in partial section of the sealing device in FIG. 4 mounted in a pump.

With further reference to FIG. 4, the sealing device comprises a sleeve 10, a rotary collar 40, an alignment collar 30, a spring 20, a first O-ring 45, a stationary collar 50, a mounting bracket 60, a second O-ring 65, a third O-ring 66, a mounting collar 70 and a locking pin 80.

The sleeve 10 has a top end, a bottom end, a shaft hole 11, an annular flange 12 and multiple transverse holes 13 and may further have a mounting slot 15 and a leakage-proof O-ring 16.

The top end of the sleeve 10 may be curved outward to block the other elements that are mounted around the sleeve 10, as shown in FIG. 4.

The shaft hole 11 is defined longitudinally through the sleeve 10, is mounted around the shaft 95 and has an inner surface.

The annular flange 12 is mounted securely around the sleeve 10, has a top edge and an annular slot 120 and may further have multiple alignment notches 121. The annular slot 120 is defined between the sleeve 10 and the annular flange 12 and has an open top adjacent to the top edge of the annular flange 12. The alignment notches 121 are defined in the top edge of the annular flange 12.

The transverse holes 13 are defined transversely through the sleeve 10 near the top end.

The mounting slot 15 is defined radially in the inner surface of the shaft hole 11 near the bottom end.

The leakage-proof O-ring 16 may be resilient and is mounted in the mounting slot 15 and water-tightly contacts the shaft 95 to prevent water in the water chamber 91 from leaking.

The rotary collar 40 is mounted un-rotatably and slidably around the sleeve 10, has a bottom end and a mounting hole 41 and may further have a disk 42, an annular skirt 43, an assembling slot 430 and multiple positioning notches 431.

The mounting hole 41 is defined axially through the rotary collar 40, is mounted around the sleeve 10 and has an inner surface.

The disk 42 is formed on the rotary collar 40 around the mounting hole 41.

The annular skirt 43 is formed on and protrudes downward from the disk 42 and has a bottom edge and an assembling slot 430. The assembling slot 430 is defined radially in the inner surface of the mounting hole 41 and adjacent to the bottom end of the rotary collar 40.

The positioning notches 431 are defined in the bottom edge of the annular skirt 43.

The alignment collar 30 is mounted un-rotatably and slidably around the sleeve 10 and has a central hole 31 and multiple positioning protrusions 32.

The central hole 31 is defined axially through the alignment collar 30 and is mounted around the sleeve 10.

The positioning protrusions 32 are formed on and protrude radially outward from the alignment collar 30, are slidably mounted respectively in the alignment notches 121 of the sleeve 10 and are mounted respectively in the positioning notches 431 of the rotary collar 40. Therefore, the shaft 95, sleeve 10 and rotary collar 40 rotate synchronously on the housing 90 of the pump.

The spring 20 is mounted around the sleeve 10 in the annular slot 120 and has two ends respectively pressing against the annular flange 12 and the alignment collar 30.

The first O-ring 45 may be resilient, is mounted water-tightly between the sleeve 10 and the rotary collar 40 and may be mounted around the sleeve 10 in the assembling slot 430 of the rotary collar 40.

The stationary collar 50 is mounted rotatably on the sleeve 10 above the rotary collar 40, rotatably contacts the rotary collar 40, has a top end, a bottom end and a collar hole 51 and may further have a positioning flange 52 and a locking notch 511.

The collar hole 51 is defined axially through the stationary collar 50 and is mounted around the sleeve 10.

The positioning flange 52 is formed on and protrudes radially outward from the stationary collar 50.

The locking notch 511 is defined in the top end of the stationary collar 50.

The mounting bracket 60 is mounted rotatably around the sleeve 10 above the stationary collar 50, has a through hole 61 and may further have a mounting board 62 and a cylinder 63.

The through hole 61 is defined through the mounting bracket 60 and is mounted around the sleeve 10.

The mounting board 62 is formed on the mounting bracket 60 around the through hole 61, is mounted securely on the housing 90 of the pump and has a bottom surface and a pin hole 622. The pin hole 622 is defined in the bottom surface of the mounting board 62.

The cylinder 63 is formed on and protrudes downward from the mounting board 62 and has a bottom end, a recess 631 and an annular positioning groove 64. The recess 631 is defined in the bottom end, partially accommodates the stationary collar 50 and having an inner surface. The annular positioning groove 64 is defined radially in the cylinder 63.

The second O-ring 65 may be resilient, is mounted between the mounting bracket 70 and the stationary collar 50 and may be mounted around the stationary collar 50 and water-tightly abuts the recess 631 of the mounting bracket 60.

The third O-ring 66 may be resilient, is mounted around the cylinder 63 of the mounting bracket 60 in the annular positioning groove 64 and water-tightly abuts an inner surface of the shaft aperture 93 of the housing 90.

The mounting collar 70 is mounted detachably around the sleeve 10 above the mounting bracket 60 and blocks and prevents the rotary collar 40, stationary collar 50 and mounting bracket 60 from falling off. The mounting collar 70 has a fastening hole 71, multiple threaded holes 73, multiple bolts 74 and a washer 75.

The fastening hole 71 is defined axially through the mounting collar 70 and is mounted around the sleeve 10.

The threaded holes 73 are defined radially through the mounting collar 70 and are aligned respectively with the transverse holes 13 of the sleeve 10.

The bolts 74 are mounted respectively through the threaded holes 73 and respectively extend in the transverse holes 13 to mount the mounting collar 70 on the sleeve 10.

The washer 75 may be metal or rubber and is mounted around the sleeve 10 between the mounting collar 70 and the mounting bracket 60 to prevent rub therebetween.

The locking pin 80 is mounted securely between the stationary collar 50 and the mounting bracket 60 to prevent relative rotation between the stationary collar 50 and the mounting bracket and may have two ends. The ends of the locking pin 80 respectively extend in the locking notch 511 of the stationary collar 50 and the pin hole 622 of the mounting bracket 60.

The first O-rings 45, second O-ring 65, third O-rings 66 and leakage-proof O-ring 16 provide multiple sealing functions to effectively prevent water in the water chamber 91 from leaking through the sealing device. Furthermore, the locking pin 80 keeps the stationary collar 50 and mounting bracket 60 un-rotated on the housing 90 of the pump and stabilize the rotation of the sleeve 10 and the rotary collar 40.

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A sealing device for a pump comprising:
   a sleeve having a top end and a bottom end and further having
      a shaft hole defined longitudinally through the sleeve and having an inner surface; and
   an annular flange mounted around the sleeve and having a top edge and an annular slot defined between the sleeve and the annular flange and having an open top adjacent to the top edge of the annular flange;
   a rotary collar mounted un-rotatably and slidably around the sleeve and having a bottom end and a mounting hole defined axially through the rotary collar, mounted around the sleeve and having an inner surface;
   a first O-ring mounted water-tightly between the sleeve and the rotary collar;
   a stationary collar mounted rotatably on the sleeve above the rotary collar, rotatably contacting the rotary collar and having a top end, a bottom end and a collar hole defined axially through the stationary collar and mounted around the sleeve;
   a mounting bracket mounted rotatably around the sleeve above the stationary collar and having a through hole through the mounting bracket and mounted around the sleeve;
   a second O-ring mounted between the mounting bracket and the stationary collar;
   a mounting collar mounted around the sleeve above the mounting bracket and preventing the rotary collar, stationary collar and mounting bracket from falling off; and
   a locking pin mounted securely between the stationary collar and the mounting bracket to prevent relative rotation between the stationary collar and the mounting bracket;

wherein the mounting bracket further has
a mounting board formed on the mounting bracket around the through hole; and
a cylinder formed on and protruding downward from the mounting board and having a bottom end and a recess defined in the bottom end, partially accommodating the stationary collar and having an inner surface;
wherein the rotary collar further has
a disk formed on the rotary collar around the mounting hole;
an annular skirt formed on and protruding downward from the disk and having a bottom edge; and
an assembling slot defined radially in the inner surface of the mounting hole and adjacent to the bottom end of the rotary collar;
wherein the first O-ring is mounted around the sleeve in the assembling slot of the rotary collar;
wherein an alignment collar is mounted un-rotatably and slidably around the sleeve and has a central hole defined axially through the alignment collar and mounted around the sleeve; and
wherein a spring is mounted around the sleeve in the annular slot and has two ends respectively pressing against the annular flange and the alignment collar;
wherein the stationary collar further has a positioning flange formed on and protruding radially outward from the stationary collar; and
the second O-ring is mounted around the stationary collar in the recess of the mounting bracket and water-tightly abuts the inner surface of the recess of the mounting bracket;
wherein the sleeve further has multiple transverse holes defined transversely through the sleeve near the top end;
the mounting collar has a fastening hole defined axially through the mounting collar and mounted around the sleeve;
multiple threaded holes defined radially through the mounting collar and aligned respectively with the transverse holes of the sleeve; and
multiple bolts mounted respectively through the threaded holes and respectively extending in the transverse holes;
wherein the cylinder of the mounting bracket further has an annular positioning groove defined radially in the cylinder; and
a third O-ring is mounted around the cylinder of the mounting bracket in the annular positioning groove;
wherein the annular flange of the sleeve further has multiple alignment notches defined in the top edge of the annular flange;
wherein the rotary collar further has multiple positioning notches defined in the bottom edge of the annular skirt; and
wherein the alignment collar further has multiple positioning protrusions formed on and protruding radially outward from the alignment collar, slidably mounted respectively in the alignment notches of the annular flange and mounted respectively in the positioning notches of the rotary collar.

2. The sealing device as claimed in claim 1, wherein a washer is mounted around the sleeve between the mounting collar and the mounting bracket.

3. The sealing device as claimed in claim 1, wherein the sleeve further has
a mounting slot defined radially in the inner surface of the shaft hole near the bottom end of the sleeve; and
a leakage-proof O-ring mounted in the mounting slot.

4. The sealing device as claimed in claim 1, wherein
the stationary collar further has a locking notch defined in the top end of the stationary collar;
the mounting board of the mounting bracket has a bottom surface and a pin hole defined in the bottom surface; and
the locking pin has two ends respectively extending in the locking notch of the stationary collar and the pin hole of the mounting bracket.

* * * * *